United States Patent
Yasumura

(10) Patent No.: US 9,664,896 B1
(45) Date of Patent: May 30, 2017

(54) PRE-TILTED MEMS MIRRORS

(71) Applicant: Google Inc., Mountain View, CA (US)

(72) Inventor: Kevin Yasumura, Lafayette, CA (US)

(73) Assignee: Google Inc., Mountain View, CA (US)

( * ) Notice: Subject to any disclaimer, the term of this patent is extended or adjusted under 35 U.S.C. 154(b) by 305 days.

(21) Appl. No.: 14/209,356

(22) Filed: Mar. 13, 2014

(51) Int. Cl.
*G02B 26/08* (2006.01)

(52) U.S. Cl.
CPC .................. *G02B 26/0833* (2013.01)

(58) Field of Classification Search
CPC .............. G02B 26/0833; G02B 26/105; G02B 27/0172; G02B 26/0841; G02B 26/085; G02B 26/0858; G02B 6/3584; G02B 21/0048; G02B 6/3518
USPC ..................... 359/198.1–199.4, 201.1–204.4, 359/224.1–224.2; 310/40 MM, 309, 311; 385/18
See application file for complete search history.

(56) References Cited

U.S. PATENT DOCUMENTS

| | | | |
|---|---|---|---|
| 6,628,857 B1 * | 9/2003 | Bonadeo .............. | G02B 6/3556 385/18 |
| 7,042,609 B2 * | 5/2006 | Buzzetta ............ | G02B 6/29307 310/309 |
| 2008/0137172 A1 | 6/2008 | Staker | |

FOREIGN PATENT DOCUMENTS

EP   1102096 B1   3/2005

OTHER PUBLICATIONS

Chu et al., 'Design and Nonlinear Servo Control of MEMS Mirrors and Their Performance in a Large Port-count Optical Switch,' IEEE Journal of Microelectromechanical Systems, Dec. 2003, 9 pages.

\* cited by examiner

*Primary Examiner* — James Phan

(74) *Attorney, Agent, or Firm* — Fish & Richardson P.C.

(57) ABSTRACT

A micro-electro-mechanical systems (MEMS) mirror array can include pre-tilted mirrors. In some implementations, a MEMS mirror array includes a set of first MEMS mirrors supported by a mounting surface of one or more first substrates, and a set of exterior MEMS mirrors supported by a mounting surface of one or more exterior substrates. The one or more exterior substrates can be disposed along at least one edge of an exterior perimeter of at least one of the first substrates. The mounting surface of the one or more exterior substrates can be arranged to cause a plane of each exterior MEMS mirror to be at a non-zero angle with respect to each first MEMS mirror. The one or more first substrates and the one or more exterior substrates can be supported by a common substrate.

12 Claims, 5 Drawing Sheets

PRE-TILTED MEMS MIRRORS

BACKGROUND

Optical cross-connect systems are used to switch optical signals in fiber optic networks. Optical cross-connect systems typically include mirrors for redirecting input optical signals from input fibers to output fibers. For example, some optical connect systems include an array of micro-electromechanical systems (MEMS) mirrors for reflecting input optical signals onto another array of MEMS mirrors that, in turn, reflect the optical signals onto the output fibers. The mirrors can be rotated using actuators to align the optical signals onto the appropriate fibers.

The mirror arrays are typically arranged in an N×M grid (e.g., 10×12 or 12×12). In such an arrangement, the outer mirrors (those closer to the perimeter of the array) generally have to have a greater range of rotation than the inner mirrors to ensure proper reflection to output fibers. As optical cross-connect system sizes increase, the required range of angular rotation of the outer mirrors also increases. This increase in angular motion calls for higher performance actuators and can cause increased stress within the MEMS mirror array structure, thereby decreasing reliability and lifetime of the MEMS mirror elements.

SUMMARY

This specification describes technologies relating to MEMS mirror arrays.

In general, one innovative aspect of the subject matter described in this specification can be implemented in a MEMS mirror array that includes a set of first MEMS mirrors supported by a mounting surface of one or more first substrates; and a set of second MEMS mirrors supported by a mounting surface of one or more second substrates, the one or more second substrates being disposed along at least one edge of an exterior perimeter of at least one of the one or more first substrates, the mounting surface of the one or more second substrates being arranged to cause a plane of each second MEMS mirror to be at a non-zero angle with respect to a plane of each first MEMS mirror, where the one or more first substrates and the one or more second substrates are supported by a common substrate.

These and other implementations can each optionally include one or more of the following features. In some aspects, the mounting surface of the one or more second substrates is sloped at a non-zero angle with respect to the mounting surface of the one or more first substrates.

In some aspects, the second MEMS mirrors supported by the mounting surface of the one or more second substrates are pre-tilted towards a center of the MEMS mirror array due to the slope of the mounting surface of the one or more second substrates. Aspects can include a set of third MEMS mirrors supported by a mounting surface of one or more third substrates. The one or more third substrates can be disposed between the one or more first substrates and the one or more second substrates. The mounting surface of the one or more third substrates can be sloped at a non-zero angle with respect to the mounting surface of the one or more first substrates. In some aspects, the angle of slope of the mounting surface of the one or more third substrates is less than an angle of slope of the mounting surface of the one or more second substrates.

In some aspects, each of the first MEMS mirrors is rotatable towards a center of the MEMS mirror array at a first angular rotation range and each of the second MEMS mirrors is rotatable towards the center of the MEMS mirror array at a second angular rotation range. The first angular rotation range can be greater than the second angular rotation range.

In some aspects, the one or more interior first substrates include two or more separate substrates. Each separate substrate can include two or more of the first MEMS mirrors. In some aspects, the one or more second substrates include two or more separate substrates. Each separate substrate can include two or more of the second MEMS mirrors.

In general, another aspect of the subject matter described in this specification can be implemented in a MEMS mirror array that includes a set of first MEMS mirrors supported by a mounting surface of one or more first substrates, each of the one or more first substrates being supported by a surface of a respective first mounting block; and a set of second MEMS mirrors supported by a mounting surface of one or more second substrates, the one or more second substrates being disposed along at least one exterior edge of at least one of the one or more first substrates, each of the one or more second substrates being supported by a surface of a respective exterior second mounting block, the surface of each respective second mounting block being arranged to cause the mounting surface of the second substrate supported by the respective mounting block to be at a non-zero angle with respect to the mounting surface of each first substrate, where each respective first mounting block and each respective second mounting block is supported by a common substrate.

These and other implementations can each optionally include one or more of the following features. In some aspects, the surface of each second mounting block is sloped at a non-zero angle with respect to the surface of each first mounting block. The second MEMS mirrors supported by the mounting surface of the one or more second substrates can be pre-tilted towards a center of the MEMS mirror array due to the slope of the respective second mounting block on which the one or more second substrates are supported.

Aspects can include a set of third MEMS mirrors supported by a mounting surface of one or more third substrates. The one or more third substrates can be disposed between the one or more first substrates and the one or more second substrates. Each of the one or more third substrates can be mounted on a surface of a respective third mounting block. The surface of each respective third mounting block can be sloped at a non-zero angle with respect to the mounting surface of the one or more first substrates. In some aspects, the angle of slope of the surface of each third mounting block is less than the angle of slope of the surface of each respective second mounting block.

In some aspects, each of the first MEMS mirrors is rotatable towards a center of the MEMS mirror array at a first angular rotation and each of the second MEMS mirrors is rotatable towards the center of the MEMS mirror array at a second angular rotation range. The first angular rotation range can be greater than the second angular rotation range.

In some aspects, the one or more first substrates include two or more separate substrates. Each separate substrate can include two or more of the first MEMS mirrors. In some aspects, the one or more second substrates include two or more separate substrates. Each separate substrate can include two or more of the second MEMS mirrors.

In general, another aspect of the subject matter described in this specification can be implemented in methods that include the actions of receiving, from a set of input collimators, photons at a first MEMS mirror array that includes one or more first interior mirror units and one or more first exterior mirror units disposed along at least one exterior edge of at least one first interior mirror unit, each first interior mirror unit and each first exterior mirror unit including one or more first MEMS mirrors, and each first exterior mirror unit being supported by a first mounting block that pre-tilts the one or more first MEMS mirrors of the first exterior mirror unit towards a center of the first MEMS mirror array; reflecting the photons from the first MEMS mirrors of the first MEMS mirror array to a second MEMS mirror array, the second MEM mirror array including one or more second interior mirror units and one or more second exterior mirror units disposed along at least one exterior edge of at least one second interior mirror unit, each second interior mirror unit and each second exterior mirror unit including one or more second MEMS mirrors, and each second exterior mirror unit being supported by a second mounting block that pre-tilts the one or more second MEMS mirrors of the second exterior mirror unit towards a center of the second MEMS mirror array; and reflecting the photons from the second MEMS mirrors of the second MEMS array to a set of output collimators.

These and other implementations can each optionally include one or more of the following features. In some implementations, the first MEMS mirror array includes one or more first intermediate mirror units disposed between the one or more first interior mirror units and the one or more first exterior mirror units. Each first intermediate mirror unit can include one or more intermediate MEMS mirrors. Each first intermediate mirror unit can be supported by an intermediate mounting block that pre-tilts the one or more intermediate MEMS mirrors of the intermediate mirror unit towards a center of the first MEMS mirror array.

In some aspects, each first mounting block includes a sloped mounting surface on which a respective first exterior mirror unit is mounted. The sloped mounting surface can be sloped at an angle towards the center of the first MEMS mirror array. In some implementations, each second mounting block includes a second sloped mounting surface on which a respective second exterior mirror unit is supported. The second sloped mounting surface can be sloped at an angle towards the center of the second MEMS mirror array.

In some aspects, each first mounting block is attached to a common substrate. In some aspects, each first interior mirror unit is supported by a respective interior mounting block.

Particular embodiments of the subject matter described in this specification can be implemented so as to realize one or more of the following advantages. The range of rotation of MEMS mirrors (e.g., mirrors arranged along the exterior of a MEMS mirror array) can be reduced by pre-tilting the MEMS mirrors, for example, by tilting the carrier or substrate on which the MEMS mirrors are mounted, sloping the substrate, or pre-tilting the mirror elements with respect to the substrate. The quality and yield of the MEMS mirror array is improved by reducing the range of rotation of the MEMS mirrors. Simpler and more reliable actuators can be used to rotate MEMS mirrors due to a reduction in the range of rotation of the MEMS mirrors.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An optical cross-connect system can include a MEMS mirror array with pre-tilted MEMS mirrors. As the rotation demand of MEMS mirrors located along the exterior of a MEMS mirror array can be greater in optical cross-connect applications than the rotation demand of MEMS mirrors located closer to the center of the MEMS mirror array, the MEMS mirrors located along the exterior can be pre-tilted towards the center of the MEMS mirror array to reduce the rotation demand of the MEMS mirrors located along the exterior.

The MEMS mirrors can be arranged on multiple mirror units. Each mirror unit can include two or more MEMS mirrors supported by a common substrate. Some of the mirror units can include pre-tilted mirrors, for example, depending on the location of the mirror units in the MEMS mirror array. For example, MEMS mirrors fabricated on mirror units that are to be located along the exterior of the MEMS mirror array may be pre-tilted towards the center of the MEMS mirror array. Conversely, MEMS mirrors supported by mirror units that are to be located near the center of the MEMS mirror array may not be pre-tilted with respect to the surface of the common substrate.

In some implementations, the MEMS mirrors can be tilted according to their relative position in the MEMS mirror array 140. For example, MEMS mirrors located along the interior of the MEMS mirror array 140, relative to MEMs mirrors located along the exterior of the MEMS mirror array 140, are referred to herein as interior MEMS mirrors or first MEMS mirrors. Similarly, MEMS mirrors located along the exterior of the MEMS mirror array 140 relative to the MEMS mirrors located along the interior are referred to herein as exterior MEMS mirrors or second MEMS mirrors. In addition, MEMS mirrors located between interior MEMS mirrors and exterior MEMS mirrors are referred to herein as intermediate MEMS mirrors and third MEMS mirrors.

Figure 1:
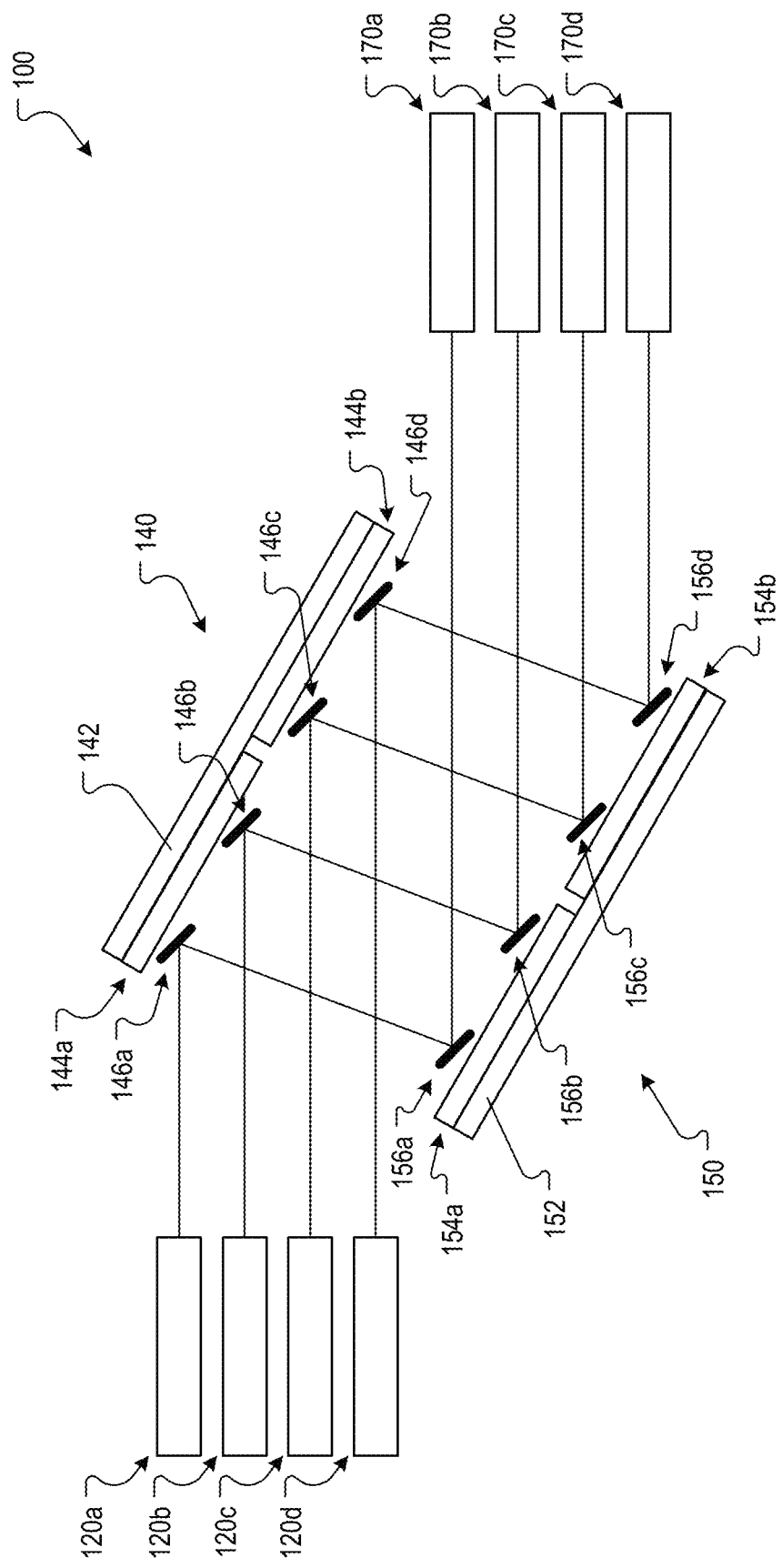
FIG. 1 is a block diagram of an example optical cross-connect system.

FIG. 1 is a block diagram of an example optical cross-connect system 100. The optical cross-connect system 100 can be used to switch optical signals, for example, from one circuit to another in a fiber optic network. The example optical cross-connect system 100 includes a set of input collimators 120a-120d, two MEMS mirror arrays 140 and 150, and a set of output collimators 170a-170d. The relative dimensions depicted are illustrative only and not necessarily to scale.

Each input collimator 120a-120d can align respective input optical signals, e.g., optical pulses, photons, or beams of light, toward a mirror of the input MEMS mirror array 140. In particular, the collimator 120a aligns optical signals toward a MEMS mirror 146a; the collimator 120b aligns optical signals toward a MEMS mirror 146b; the collimator 120c aligns optical signals toward a MEMS mirror 146c; and the collimator 120d aligns optical signals toward a MEMS mirror 142*d*. A misaligned optical signal may not be reflected appropriately by the MEMS mirrors 146*a*-146*d*.

Each input collimator 120*a*-120*d* can include a lens for aligning its respective optical signals. In some implementations, the input collimators 120*a*-120*d* are configured to attach to optical fibers. For example, each input collimator 120*a*-120*d* may be attached to a respective optical fiber for receiving optical signals from the optical fiber. In some implementations, the input collimators 120*a*-120*d* may be configured as one or more bundles or arrays of collimators. The bundles of input collimators 120*a*-120*d* can be connected to or otherwise arranged to receive and align optical signals received from optical fibers.

The MEMS mirror array 140 includes MEMS mirrors 146*a*-146*d*. Each MEMS mirror 146*a*-146*d* can have a round (or other appropriate shape) reflective surface. The diameter of the MEMS mirrors 146*a*-146*d* can vary, for example, based on the optical configuration of the optical cross-connect system 100. For example, the diameter of a MEMS mirror may range from several hundred micrometers to over a millimeter. Each MEMS mirror 146*a*-146*d* can be rotated about one or more axes (e.g., two axes) to guide the optical signal to a corresponding MEMS mirror on the MEMS mirror array 150. The MEMS mirror array 140 can include, for each MEMS mirror 146*a*-146*d*, an actuator that rotates the MEMS mirror 146*a*-146*d*. For example, the MEMS mirror array 140 may include a parallel-plate actuator or a comb-drive style actuator (e.g., a vertical comb-drive actuator) for each MEMS mirror 146*a*-146*d*.

Figure 2:
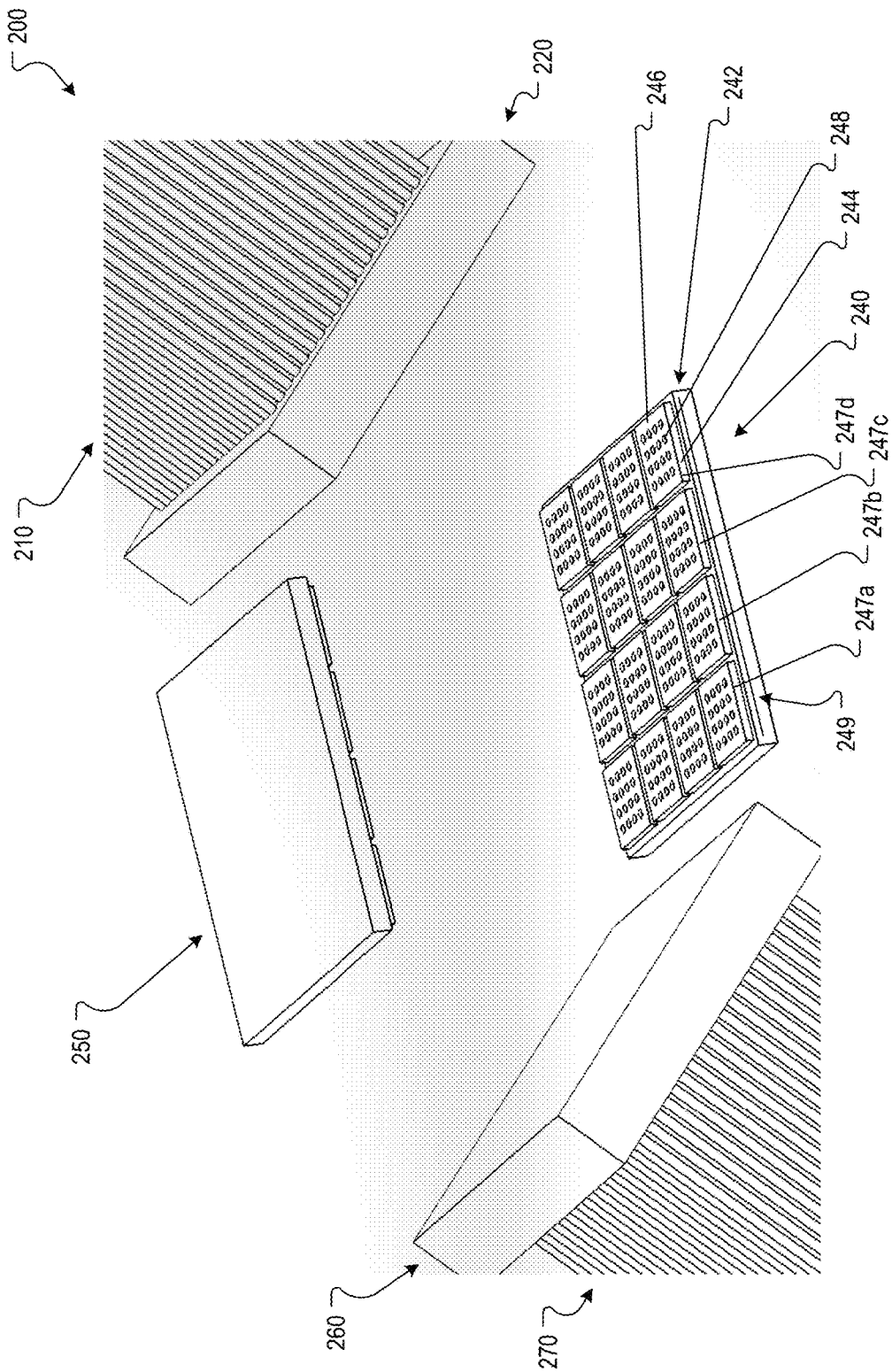
FIG. 2 is a perspective view of an example optical cross-connect system.
Figure 3:
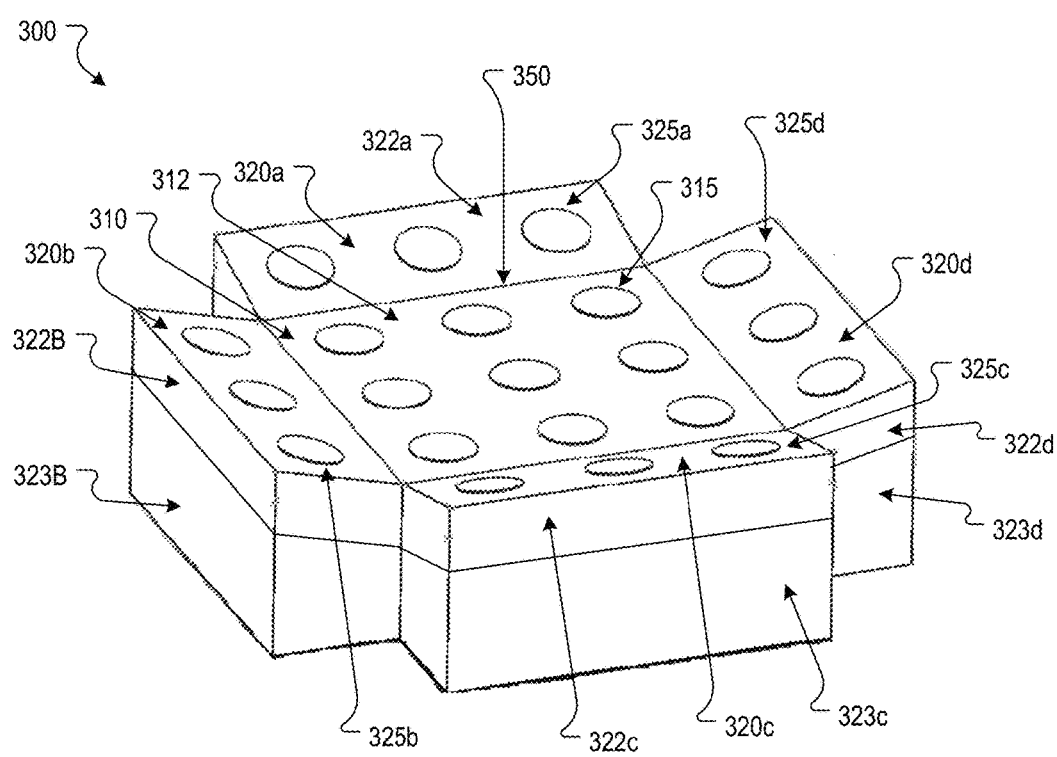
FIG. 3 is a block diagram of an example MEMS mirror array that includes pre-tilted mirrors.
Figure 4:
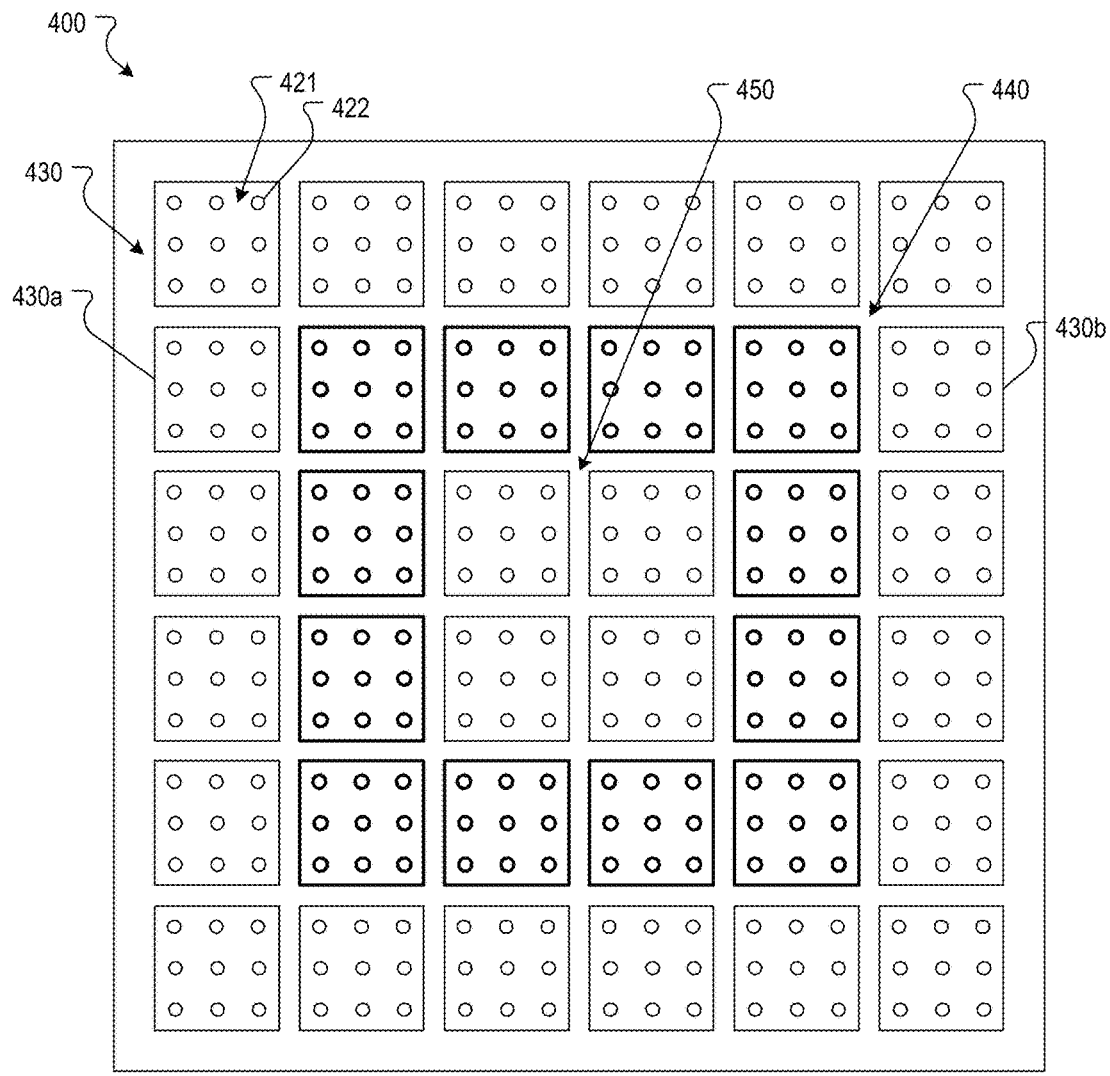
FIG. 4 is a block diagram of another example MEMS mirror array that includes sub-dies with pre-tilted MEMS mirrors.

In some implementations, the MEMS mirrors 146*a*-146*d* of the MEMS mirror array 140 are supported by multiple mirror units, e.g., mirror units 144*a* and 144*b*. For example, the MEMS mirrors 146*a*-146*d* may be fabricated, built, or otherwise installed on or supported by the mirror units 144*a* and 144*b*. Each mirror unit 144*a* and 144*b* can include two or more MEMS mirrors (and their actuators) supported by (e.g., fabricated on) a substrate or sub-die. For example, the MEMS mirrors 146*a* and 146*b* are supported by a substrate of the mirror unit 144*a* and the MEMS mirrors 146*c* and 146*d* are supported by a substrate of the mirror unit 144*b*. The mirror units 144*a* and 144*b* can be installed on a common surface 142, e.g., of another substrate. The surface 142 may be made from a ceramic, e.g., a high temperature co-fired ceramic (HTCC) substrate, a low temperature co-fired ceramic (LTCC) substrate, an alumina-based substrate, a silicon substrate, a polymide-based substrate, or other appropriate materials. Although the example MEMS mirror array 140 is illustrated as having two mirror units 144*a* and 144*b* that each have two MEMS mirrors 146*a*-146*d*, other arrangements are possible. For example, the MEMS mirror array 140 may have a square or rectangular shaped array of mirror units (e.g., a 4×4, 6×6, or 8×8 array) in which each mirror unit includes two or more MEMS mirrors. Some example MEMS mirror arrangements are illustrated in FIGS. 2-4 and described below.

As described in more detail below, some of the MEMS mirrors of the MEMS mirror array 140 may be pre-tilted. In optical cross-connect applications, the rotation demand of MEMS mirrors towards the center of a MEMS mirror array may increase with an increase in the distance that the MEMS mirror is moved from the center of the MEMS mirror array. For example, it may be beneficial for the MEMS mirror 146*a* to rotate a greater amount towards the center of the MEMS mirror array 140 than the MEMS mirror 146*b* to appropriately align their optical signals towards corresponding MEMS mirrors of the MEMS mirror array 150.

MEMS mirrors located away from the center of the MEMS mirror array 140 (e.g., MEMS mirrors located along the exterior of the MEMS mirror array 140) may be pre-tilted towards the center of the MEMS mirror array 140. In some implementations, one or more of the MEMS mirrors 146*a*-146*d* may be pre-tilted by supporting or installing the MEMS mirrors 146*a*-146*d* on substrates or sub-dies having a sloped surface. For example, the surface of the substrate by which the MEMS mirrors 146*a*-146*d* are supported may be sloped at an angle moving from a point on the surface that is most distant from the center of the MEMS mirror array 140 to a point on the surface that is closest to the center of the MEMS mirror array 140.

In some implementations, one or more of the MEMS mirrors 146*a*-146*d* are pre-tilted by supporting or installing the MEMS mirrors 146*a*-146*d* on substantially flat substrates. The substrates, and thus the MEMS mirrors 146*a*-146*d* supported by the substrates, can be tilted by mounting the substrates on blocks or mounts that tilt the substrates at an appropriate angle. For example, each mirror unit of a MEMS mirror array may have the same, or a similar shaped substrate. The substrates of mirror units that will be located along the exterior of a MEMS mirror array may be mounted on blocks or mounts that tilt the MEMS mirrors of the mirror units towards the center of the MEMS mirror array. The substrates of mirror units that will be located in the interior of a MEMS mirror array may be mounted on blocks or mounts that do not tilt the MEMS mirrors of the mirror units towards the center of the MEMS mirror array (or that tilt the mirrors at a smaller angle than the exterior mirror units).

The MEMS mirrors 146*a*-146*d* can also be pre-tilted using resist (or other organic/stressed materials) to act as hinges. The material can be applied to form the hinge and then cured. This curing can add the stress. After the material is cured, the material can be released. The stress of the material can pre-tilt the MEMS mirrors 146*a*-146*d* upwards.

The MEMS mirror array 150 can be similar to, or the same as, the MEMS mirror array 140. The MEMS mirror 150 includes MEMS mirrors 156*a*-156*d* that reflect optical signals received from the MEMS mirrors 146*a*-146*d* to output collimators 170*a*-170*d*. Each of the MEMS mirrors 156*a*-156*d* can be rotated, for example along one or more axes, by an actuator to guide the optical signals to the appropriate output collimator 170*a*-170*c*. The MEMS mirrors 156*a*-156*d* are fabricated on mirror units 154*a* and 154*b*. For example, the MEMS mirrors 156*a* and 156*b* are fabricated on a substrate of the mirror unit 154*a* and the MEMS mirrors 156*c* and 156*d* are fabricated on a substrate of the mirror unit 154*b*. The mirror units 154*a* and 154*b* can be installed on a common surface 152, e.g., of another substrate.

The output collimators 170*a*-170*d* align the optical signals received from the MEMS mirrors 156*a*-156*d* and provide the aligned optical signals to optical fibers. Each output collimator 170*a*-170*d* can include a lens for aligning its respective optical signals. In some implementations, the output collimators 170*a*-170*d* are configured to attach to optical fibers. For example, each output collimator 170*a*-170*d* may be attached to a respective optical fiber for sending optical signals to the optical fiber.

Although four input collimators 120*a*-120*d*, four input MEMS mirrors 146*a*-146*d*, four output MEMS mirrors 156*a*-156*d*, and four output collimators 170*a*-170*d* are illustrated in FIG. 1, the example optical cross-connect system 100 can include other appropriate numbers of each component. For example, a 128 port optical cross-connect system may include 128 input collimators, 128 input MEMS mirrors, 128 output MEMS mirrors, and 128 output collimators, one of each component for each port. In some implementations, the optical cross-connect system 100 includes more MEMS mirrors (input and/or output) and/or more collimators (input and/or output) than ports to account for any non-functioning components. For example, a 128 port optical cross-connect system may include 144 input and output collimators and 144 input and output MEMS mirrors.

In some implementations, the collimators 120a-120d and 170a-170d may be arranged in multiple collimator bundles. For example, the input collimators 120a-120d may be arranged in bundles based on the arrangement of the mirror units 154a and 154b. The optical cross-connect system 100 may include a collimator bundle for each mirror unit 154a and 154b. For example, the optical cross-connect system 110 may include a collimator bundle that includes the input collimators 120a and 120b for the mirror unit 154a and a collimator bundle that includes the input collimators 120c and 120d for the mirror unit 154b. The collimator bundles may be self-contained bundles that are manufactured separately from each other and replaceable separately from each other.

FIG. 2 is a perspective view of an example optical cross-connect system 200. The example optical cross-connect system 200 includes an input fiber array 210, an input collimator unit 220, an input MEMS mirror array 240, and output MEMS mirror array 250, an output collimator unit 260, and an output fiber array 270. The relative dimensions depicted are illustrative only and not necessarily to scale.

The example optical cross-connect system 200 can include any appropriate number of ports, such as 128, 256, 1024, or more or less. The collimator units 220 and 260 can be configured to receive an optical fiber for each port. For example, a collimator unit for a 128 port optical cross-connect system may be configured to attach to a 128 fiber array. Each collimator unit 220 and 260 can include a collimator for each port of the optical cross-connect system 200. In some implementations, the collimator units 220 and 260 may include additional collimators in excess of the number of ports, for example, in case one or more of the collimators fail.

The collimators of the input collimator unit 220 can each align optical signals received from a corresponding optical fiber of the input fiber array 210 towards a corresponding MEMS mirror 248 of the input MEMS mirror array 240. Similarly, the collimators of the output collimator unit 260 can each align optical signals received from corresponding MEMS mirror of the output MEMS mirror array 250 towards a corresponding optical fiber of the output fiber array 270.

The MEMS mirror arrays 240 and 250 include MEMS mirrors for reflecting optical signals received from the input collimator unit 220 to the output collimator unit 260 as shown by the example optical signal path 230. Each MEMS mirror array 240 and 250 can include a MEMS mirror for each port of the optical cross-connect system 200 and optionally one or more additional mirrors to account for the failure of a mirror.

The MEMS mirror arrays 240 and 250 can include multiple mirror units. For example, the MEMS mirror array 240 includes sixteen mirror units 244 arranged in four rows of four mirror units 244. Each mirror unit 244 can include a sub-die made of a substrate and two or more MEMS mirrors 248 built, fabricated, or otherwise installed on or supported by a surface 246 of the sub-die. The sub-die of each individual mirror unit 244 of a MEMS mirror array 240 can be installed on or supported by a common substrate 242, e.g., an HTCC substrate, an LTCC substrate, an alumina-based substrate, a silicon substrate, a polymide-based substrate, or other appropriate material, to form the MEMS mirror array.

The MEMS mirror arrays 240 and 250 can include pre-titled MEMS mirrors. For example, MEMS mirrors positioned along the exterior of the MEMS mirror arrays 240 and 250 may be pre-tilted towards the center of the MEMS mirrors' respective array. For example, the MEMS mirrors 248 of the mirror units 247a-247d may rotate about an axis that is substantially in parallel with the line 249. Along this axis, the MEMS mirrors 248 of the mirror units 247a-247d can be rotated towards and away from the center of the MEMS mirror array 240. These MEMS mirrors 248 can be pre-tilted in the direction towards the center of the MEMS mirror array 240 to reduce the amount of rotation in that direction. In some implementations, the MEMS mirrors 248 of the mirror units 247a-247d may still rotate about the axis designated by the line 249 in the direction away from the center of the MEMS mirror array 240 to properly align optical signals.

For example, if the MEMS mirrors are flat with respect to the primary substrate plane (e.g., the surface to which the mirror units 248 are mounted), each MEMS mirror may be specified as requiring +/−N degrees of rotation about an axis that allows the MEMS mirror to rotate towards and away from the center of the MEMS mirror array 240. In this state, the MEMS mirrors in the middle of the MEMS mirror array 240 may actually use about +/−(N/2) degrees of rotation. A MEMS mirror on a particular edge of the exterior of the MEMS mirror array 240 may only use +N degrees of rotation (e.g., to align optical signals to the other side of another MEMS mirror array). Correspondingly, a MEMS mirror on an edge of the exterior of the MEMS mirror array opposite the particular edge may use −N degrees of rotation. If the MEMS mirrors on the exterior edges are pre-titled N/2 degrees, the MEMS mirrors that rotated +N degrees towards the center of the MEMS mirror array 240 would only need to rotate +N/2 to achieve the same alignment of its optical signals. However, to reach the straight through path (0 degrees of rotation originally, the MEMS mirror can rotate −N/2 degrees away from the center of the MEMS mirror array 240. In this example, total angular rotation of the MEMS mirror on the exterior is about the same, but the range is split in two directions.

MEMS mirrors 248 of the MEMS mirror array 240 can be pre-tilted, for example, by fabricating the MEMS mirrors on sloped surfaces, by mounting the mirror units on pre-sloped blocks, or by pre-titling the individual MEMS mirror elements. Example MEMS mirror arrays having pre-tilted MEMS mirrors are illustrated in FIGS. 3 and 4, and described below.

FIG. 3 is a block diagram of an example MEMS mirror array 300 that includes pre-tilted mirrors. The example MEMS mirror array 300 includes a mirror unit 310 that has nine MEMS mirrors 315 fabricated on a sub-die 312. For example, the MEMS mirrors 315 may be fabricated on a mounting surface of the sub-die 312. In this example MEMS mirror array 300, the mirror unit 310 includes three rows of MEMS mirrors 315 with three MEMS mirrors 315 in each row. In other implementations, the mirror unit 310 may include other appropriate numbers of MEMS mirrors and/or MEMS mirrors arranged in other configurations. The relative dimensions depicted are illustrative only and not necessarily to scale.

The MEMS mirror array 300 also includes four mirror units 320a-320d arranged around the mirror unit 310. For example, the mirror unit 310 may be positioned at the center of the MEMS mirror array 300 and the mirror units 320a-320d may be positioned along the exterior of the MEMS mirror array 300. The mirror units 320a-320d can be disposed along at least one edge of an exterior perimeter of the mirror unit 310. For example, a mirror unit 320a-320d may be disposed along each exterior edge of the mirror unit 310. Each mirror unit 320a-320d includes three MEMS mirrors 325a-325d fabricated on a sub-die 322a-322d. One or more of the mirror units 320a-320d can include other appropriate numbers of MEMS mirrors, e.g., three rows of MEMS mirrors with three MEMS mirrors in each row similar to the mirror unit 310.

The mirror units 310 and 320a-320d can each be attached to a common substrate. For example, the sub-die of each individual mirror unit 310 and 320a-320d can be installed on a common substrate, e.g., an HTCC substrate or an alumina-based substrate, to form the MEMS mirror array. The mirror units 310 and 320a-320d may be attached to the common substrate using adhesive or eutectic die attachment methods.

In this example, the sub-die 322a-322d of each mirror unit 320a-320d is mounted on a respective mounting block 323a-323d. For example, the sub-dies 322a-322d may be mounted on a mounting block 323a-323d using adhesive or eutectic die attachment methods. The mounting blocks 323a-323d may be attached to the common substrate using similar methods. In some implementations, the sub-die 322a-322d may be attached directed to the common substrate. The mirror unit 310 may also be mounted on a mounting block or attached directly to the common substrate.

The MEMS mirrors 325a-325d of the mirror units 320a-320d are pre-tilted towards the center of the MEMS mirror array 300. By pre-tilting the MEMS mirrors 325a-325d toward the center of the MEMS mirror array 300, the rotation requirement of the MEMS mirrors 325a-325d towards the center of the MEMS mirror array 300 can be reduced. For example, if a MEMS mirror 325a-325d should be able to rotate six degrees towards the center of the MEMS mirror array, the actual amount of rotation of the MEMS mirror 325a-325d can be reduced to three degrees by pre-tilting the MEMS mirror 325a-325d towards the center of the MEMS mirror array 300 by three degrees. For each degree of pre-tilt, the range of rotation of the MEMS mirrors 325a-325d can be reduced by a degree in the direction of pre-tilt. MEMS mirrors can also be pre-tilted in other appropriate directions in addition to, or instead of, towards the center of the MEMS mirror array 300.

Each MEMS mirror 325a-325d of a particular mirror unit 320a-320d may be pre-titled in the same direction. For example, each MEMS mirror 325a of the mirror unit 320a is tilted towards the center of the MEMS mirror array 300. The MEMS mirrors 325a can be rotated or tilted about an axis that is substantially parallel with the line 350 to properly align optical signals towards another object, e.g., another MEMS mirror or a collimator. By pre-tilting the MEMS mirrors 325a, the amount of rotation about the axis that is substantially parallel with the line 350 can be reduced. In some implementations, the MEMS mirrors 325a can also be titled about an axis that is substantially perpendicular to the line 350 and co-planar with the surface the mirror unit 310. An actuator, e.g., a vertical parallel plate or comb drive actuator, can rotate the MEMS mirrors 325a in response to a control signal. The MEMS mirrors 325b-325d can rotate in a similar manner as the MEMS mirrors 325a.

In some implementations, the MEMS mirrors 315 of the mirror unit 310 are not pre-tilted. Instead, the reflective surface of the MEMS mirrors 315 may be, when positioned in its default or at rest position, substantially parallel with the surface of the common substrate on which the mirror units 310 and 320a-320d are attached. The MEMS mirrors 315 may be rotated from the default (or at rest) position to properly align optical signals to other MEMS mirrors, collimators, or another device. The MEMS mirrors 325a-325d may be pre-tilted at a non-zero angle with respect to the surface of the common substrate.

In this example, the MEMS mirrors 325a-325d are pre-tilted using the mounting blocks 323a-323d. The mounting blocks 323a-323d for the exterior MEMS mirror units 320a-320d have a sloped surface on which the sub-die 322a-322d are mounted. The surfaces of the mounting blocks can be sloped at a desired angle to arrive at the desired amount of pre-tilt. In this way, the sub-die 322a-322d can be flat on each surface and can be used in the center of the MEMS mirror array where the mirrors may not be pre-tilted or along the exterior of the MEMS mirror array where the mirrors may be pre-tilted.

As shown in FIG. 3, the mounting blocks 323a-323d cause the surface of each sub-die 322a-322d to slope upwards from a point at which the surface of the sub-die 322a-322d meets (or is adjacent to) the surface of the sub-die 312 to a point on the surface of the sub-die 322a-322d that is farthest from the point on the surface of the sub-die 312. At the point at which the sub-die 322a-322d meets the sub-die 312, the surfaces may be at the same or a similar height (e.g., the distance from the surface of the common substrate on which the sub-die 312 and 322a-322d are attached).

The mirror units 310 and 320a-320d can be arranged based on the amount of pre-tilt desired for each location in the MEMS mirror array 300. For example, the sub-die 310 of the mirror unit 310 may be mounted on a substantially flat mounting block an arranged near the center of the MEMS mirror array 300. The sub-die 322a-322d may also be mounted on a respective sloped mounting block 323a-323d and arranged along the exterior of the MEMS mirror array 300.

In other implementations, the MEMS mirrors 325a-325d may be pre-tilted by sloping or otherwise tilting the respective sub-die 322a-322d. In such implementations, the sub-die 322a-322d may be attached directly to the common substrate or attached to mounting blocks. The surface of the sub-die 322a-322d may be sloped by etching or another appropriate micro fabrication process. The MEMS mirrors can then be fabricated on the surface such that the reflective surface of the MEMS mirrors are substantially parallel with the surface when the MEMS mirrors are in their default (or at rest) position. The MEMS mirrors can then be rotated from the default position to reflect optical signals appropriately. The surfaces of the sub-die 312 and 322a-322d may be fabricated based on the position in the MEMS mirror array 300 in which the sub-die 312 and 322a-322d are planned to be located. For example, the sub-die 312 that are to be located in the center of the MEMS mirror array 300 may be fabricated with a substantially flat surface, while the sub-die 322a-322d that are to be located along the exterior of the MEMS mirror array 300 may be fabricated with a sloped surface.

Due to the pre-tilt, a plane of the MEMS mirrors 325a-325d is sloped at a non-zero angle with respect to a plane of the MEMS mirrors 315. For example, when the MEMS mirrors 325a-325d and the MEMS mirrors 315 are in their default (or at rest) position, the planes of the MEMS mirrors 325a-325d are at a non-zero angle with respect to the planes of the MEMS mirrors 315.

FIG. 4 is a block diagram of another example MEMS mirror array 400 that includes mirror units with pre-tilted MEMS mirrors. The relative dimensions depicted are illustrative only and not necessarily to scale.

The example MEMS mirror array 400 includes a set of exterior mirror units 430, a set of interior mirror units 450, and a set of intermediate set of mirror units 440. The set of exterior mirror units 430 (not bolded) includes the twenty mirror units that are located along the exterior of the MEMS mirror array 400. The set of interior mirror units 450 (not bolded) includes the four mirror units located at the center of the MEMS mirror array 400. The set of intermediate mirror units 450 (bolded) includes the twelve mirror units 422 located between the exterior mirror units 430 and the interior mirror units 450. The mirror units 430, 440, and 450 can be attached to a common substrate.

Each set of mirror units can include other appropriate numbers of mirror units. For example, the MEMS mirror array 400 may include a single interior mirror unit, for example, having 36 MEMS mirrors 422. By way of another example, the exterior mirror units 430 may include four rectangular mirror units that span the area of the exterior mirror units. Each mirror unit 430, 440, and 450 include MEMS mirrors 422 fabricated on a sub-die 421. Although each mirror unit of the MEMS mirror array 400 includes three rows of three MEMS mirrors 422, the mirror units can include a different number of MEMS mirrors 422 arranged in different configurations (e.g., four rows of four MEMS mirrors). In addition, the mirror units of each set of mirror units may be different than the other mirror units. For example, each exterior mirror unit 430 may include four MEMS mirrors, while each interior mirror unit 450 includes twenty MEMS mirrors and each intermediate mirror unit 440 includes nine MEMS mirrors.

The exterior mirror units 430 and/or the intermediate mirror units 440 may include pre-tilted MEMS mirrors 422. For example, the MEMS mirrors 422 of the exterior mirror units 430 may be pre-tilted towards the center of the MEMS mirror array 400. The MEMS mirrors 422 of the mirror unit 430a may be pre-tilted towards the right and the MEMS mirrors 422 of the mirror unit 430b may be pre-tilted towards the left. In addition, or in the alternative, the MEMS mirrors 422 of the intermediate mirror units 440 may be pre-tilted towards the center of the MEMS mirror array 400.

As described above, for optical cross-connect applications, the desired range of rotation of the MEMS mirrors 422 may increase with an increase in distances between the center of the MEMS mirror array 400 and the location of the MEMS mirror. To reduce the range of rotation of the MEMS mirrors, the MEMS mirrors 422 of the intermediate mirror units 440 may be pre-tilted towards the center of the MEMS mirror array 400 at a first angle. For example, the MEMS mirrors 422 of the intermediate mirror units 440 may be pre-tilted at an angle of three degrees. As the desired range of rotation of the MEMS mirrors of the exterior mirror units 430 may be greater than the desired range of rotation of the MEMS mirrors of the intermediate MEMS mirror units, the MEMS mirrors of the exterior mirror units 430 may be pre-tilted at an angle that is greater than the pre-tilt angle of the intermediate mirror units 440. Continuing the previous example, the MEMS mirrors 422 of the exterior mirror units 440 may be pre-tilted at an angle of five degrees or another appropriate angle.

Similar to the MEMS mirrors of FIG. 3, the MEMS mirrors 422 of the exterior mirror units 430 and the MEMS mirrors of the intermediate mirror units 440 may be pre-tilted towards the center of the MEMS mirror array 400 by sloping the surface of the sub-die on which the MEMS mirrors are fabricated at an appropriate angle. The MEMS mirrors 422 can then be fabricated on the sloped surface such that the reflective surface of the MEMS mirrors 422 are parallel with the surface when the MEMS mirrors are in their default (or at rest) position. The MEMS mirrors of the exterior mirror units 430 and the intermediate mirror units 440 can also be pre-tilted by mounting the sub-die of the mirror units 430 and 440 onto pre-tilted mounting blocks, or by pre-tilting the individual MEMS mirrors 422. The MEMS mirrors 422 can then be rotated from the default position to reflect optical signals appropriately.

Figure 5:
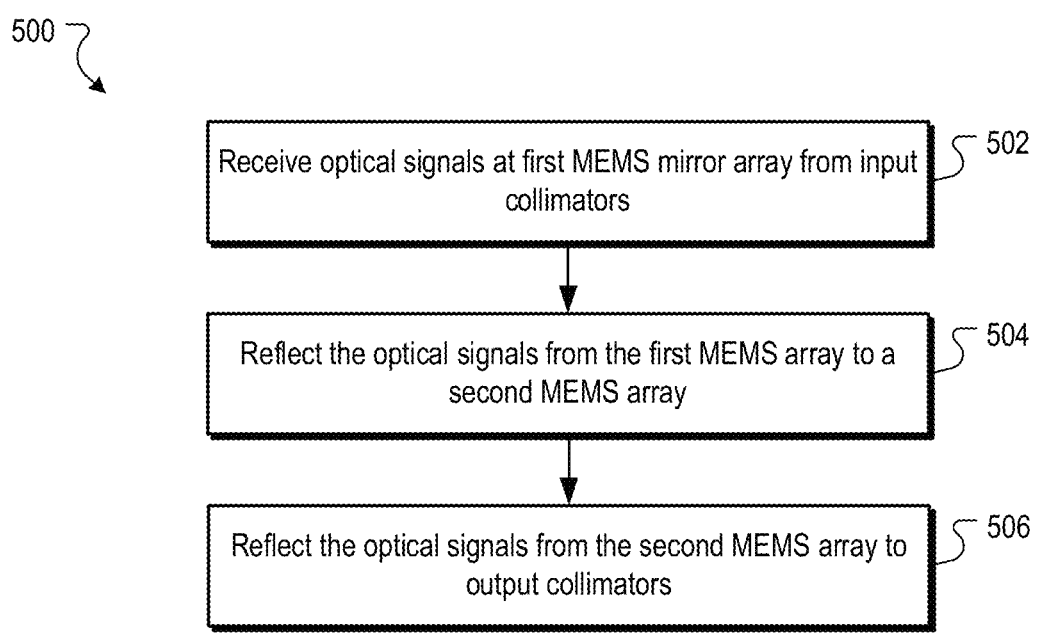
FIG. 5 is a flow chart of an example process for reflecting optical signals using MEMS mirror arrays.

FIG. 5 is a flow chart of an example process 500 for reflecting optical signals using MEMS mirror arrays. In block 502, optical signals are received at a first MEMS mirror array from input collimators. For example, MEMS mirrors of the first MEMS mirror array may receive an optical signal from a corresponding input collimator. Some of the MEMS mirrors may be pre-tilted as described above. For example, MEMS mirrors located along the exterior of the first MEMS mirror array may be pre-tilted towards the center of the first MEMS mirror array.

In block 504, the MEMS mirrors of the first MEMS mirror array reflect the received optical signals to corresponding MEMS mirrors of a second MEMs mirror array. Each MEMS mirror of the first MEMS mirror array may be rotated (e.g., about one or more axes using an actuator) to direct its optical signal to its corresponding MEMS mirrors of the second MEMS mirror array. The second MEMS mirror array may also include pre-tilted MEMS mirrors, as described above.

In block 506, the MEMS mirrors of the second MEMS mirror array reflect the optical signals received from the first MEMS mirror array to output collimators. For example, each MEMS mirror of the second MEMS mirror array may reflect a received optical signal to a corresponding output collimator. The MEMS mirrors of the second MEMS mirror array may be rotated (e.g., about one or more axes using an actuator) to direct its optical signal to its corresponding output collimator.

Embodiments of the subject matter and the operations described in this specification can be implemented in digital electronic circuitry, or in computer software, firmware, or hardware, including the structures disclosed in this specification and their structural equivalents, or in combinations of one or more of them. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A micro-electro-mechanical systems (MEMS) mirror array, comprising:
    a set of first MEMS mirrors supported by a mounting surface of one or more first substrates, each of the first MEMS mirrors being rotatable up to a first maximum angular rotation range towards a center of the MEMS mirror array;
    a set of second MEMS mirrors supported by a mounting surface of one or more second substrates, the one or more second substrates being disposed along at least one edge of an exterior perimeter of at least one of the one or more first substrates and substantially surrounding the one or more first substrates, the mounting surface of the one or more second substrates being arranged to cause a plane of each second MEMS mirror to be at a non-zero angle with respect to a plane of each first MEMS mirror, each of the second MEMS mirrors being rotatable up to a second maximum angular rotation range towards the center of the MEMS mirror array; and
    a set of third MEMS mirrors supported by a mounting surface of one or more third substrates, the one or more third substrates being disposed between the one or more first substrates and the one or more second substrates, the mounting surface of the one or more third substrates being sloped at a non-zero angle with respect to the mounting surface of the one or more first substrates,
    wherein the first maximum angular rotation range is greater than the second maximum angular rotation range, and
    wherein the one or more first substrates and the one or more second substrates are supported by a common substrate.

2. The MEMS mirror array of claim 1, wherein the mounting surface of the one or more second substrates is sloped at a non-zero angle with respect to the mounting surface of the one or more first substrates.

3. The MEMS mirror array of claim 2, wherein the second MEMS mirrors supported by the mounting surface of the one or more second substrates are pre-tilted towards the center of the MEMS mirror array due to the slope of the mounting surface of the one or more second substrates.

4. The MEMS mirror array of claim 1, wherein the angle of slope of the mounting surface of the one or more third substrates is less than an angle of slope of the mounting surface of the one or more second substrates.

5. The MEMS mirror array of claim 1, wherein the one or more first substrates include two or more separate substrates, each separate substrate including two or more of the first MEMS mirrors.

6. The MEMS mirror array of claim 1, wherein the one or more second substrates include two or more separate substrates, each separate substrate including two or more of the second MEMS mirrors.

7. A micro-electro-mechanical systems (MEMS) mirror array, comprising:
    a set of first MEMS mirrors supported by a mounting surface of one or more first substrates, each of the one or more first substrates being supported by a surface of a respective first mounting block, each of the first MEMS mirrors being rotatable up to a first maximum angular rotation range towards a center of the MEMS mirror array; and
    a set of second MEMS mirrors supported by a mounting surface of one or more second substrates, the one or more second substrates being disposed along at least one exterior edge of at least one of the one or more first substrates and substantially surrounding the one or more first substrates, each of the one or more second substrates being supported by a surface of a respective second mounting block, the surface of each respective second mounting block being arranged to cause the mounting surface of the second substrate supported by the respective second mounting block to be at a non-zero angle with respect to the mounting surface of each first substrate, each of the second MEMS mirrors being rotatable up to a second maximum angular rotation range towards the center of the MEMS mirror array; and
    a set of third MEMS mirrors supported by a mounting surface of one or more third substrates, the one or more third substrates being disposed between the one or more first substrates and the one or more second substrates, each of the one or more third substrates being mounted on a surface of a respective third mounting block, the surface of each respective third mounting block being sloped at a non-zero angle with respect to the mounting surface of the one or more first substrates,
    wherein the first maximum angular rotation range is greater than the second maximum angular rotation range, and
    wherein each respective first mounting block and each respective second mounting block is supported by a common substrate.

8. The MEMS mirror array of claim 7, wherein the surface of each second mounting block is sloped at a non-zero angle with respect to the surface of each first mounting block.

9. The MEMS mirror array of claim 8, wherein the second MEMS mirrors supported by the mounting surface of the one or more second substrates are pre-tilted towards the center of the MEMS mirror array due to the slope of the respective second mounting block on which the one or more second substrates are supported.

10. The MEMS mirror array of claim 7, wherein the angle of slope of the surface of each third mounting block is less than the angle of slope of the surface of each respective second mounting block.

11. The MEMS mirror array of claim 7, wherein the one or more first substrates include two or more separate substrates, each separate substrate including two or more of the first MEMS mirrors.

12. The MEMS mirror array of claim 7, wherein the one or more second substrates include two or more separate substrates, each separate substrate including two or more of the second MEMS mirrors.

* * * * *